United States Patent
Matsumoto

(10) Patent No.: US 9,625,733 B2
(45) Date of Patent: Apr. 18, 2017

(54) ZOOM OPTICAL SYSTEM COMPRISING DIFFRACTIVE OPTICAL ELEMENT AND IMAGING DEVICE HAVING THE SAME

(75) Inventor: Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 132 days.

(21) Appl. No.: 14/110,150

(22) PCT Filed: Mar. 14, 2012

(86) PCT No.: PCT/JP2012/001786
§ 371 (c)(1),
(2), (4) Date: Oct. 5, 2013

(87) PCT Pub. No.: WO2012/137421
PCT Pub. Date: Oct. 11, 2012

(65) Prior Publication Data
US 2014/0204462 A1    Jul. 24, 2014

(30) Foreign Application Priority Data

Apr. 6, 2011 (JP) ................................. 2011-084735

(51) Int. Cl.
*G02B 9/34* (2006.01)
*G02B 27/42* (2006.01)
(Continued)

(52) U.S. Cl.
CPC ....... *G02B 27/4205* (2013.01); *G02B 5/1852* (2013.01); *G02B 13/18* (2013.01);
(Continued)

(58) Field of Classification Search
CPC .... G02B 9/34–9/58; G02B 9/62; G02B 13/04
(Continued)

(56) References Cited

U.S. PATENT DOCUMENTS 6,124,972 A    9/2000 Hayakawa et al.
6,606,200 B1    8/2003 Nakayama et al.
(Continued)

FOREIGN PATENT DOCUMENTS

CN    1603876 A    4/2005
CN    101206302 A    6/2008
(Continued)

OTHER PUBLICATIONS

English machine translation of JP 2004 117826 A.*
(Continued)

*Primary Examiner* — Thomas K Pham
*Assistant Examiner* — Nicholas R Pasko
(74) *Attorney, Agent, or Firm* — Shapiro, Gabor and Rosenberger, PLLC

(57) ABSTRACT

A zoom optical system has, in order from an object: a first lens group G1 having positive refractive power; a second lens group G2 having negative refractive power; a third lens group G3 having positive refractive power; and a fourth lens group G4 having negative refractive power, wherein the mutual distance between the lens groups G1 to G4 change upon zooming, and one of the third lens group G3 and the fourth lens group G4 includes at least one diffractive optical element PF.

11 Claims, 9 Drawing Sheets

EXAMPLE 1

(51) Int. Cl.
*G02B 13/18* (2006.01)
*G02B 15/173* (2006.01)
*G02B 5/18* (2006.01)
*G02B 15/14* (2006.01)
*G02B 27/00* (2006.01)
*G02B 9/62* (2006.01)

(52) U.S. Cl.
CPC .......... *G02B 15/14* (2013.01); *G02B 15/173* (2013.01); *G02B 27/4211* (2013.01); *G02B 9/34* (2013.01); *G02B 9/62* (2013.01); *G02B 27/0037* (2013.01); *G02B 27/0056* (2013.01)

(58) Field of Classification Search
USPC ........ 359/682, 686–688, 747, 753, 771–783, 359/752, 756–762
See application file for complete search history.

(56) References Cited

U.S. PATENT DOCUMENTS

| | | | |
|---|---|---|---|
| 6,646,803 B2 | 11/2003 | Hayakawa et al. | |
| 6,704,149 B2* | 3/2004 | Ohmori | G02B 27/4211 359/569 |
| 6,791,754 B2* | 9/2004 | Ogawa | G02B 27/4211 359/565 |
| 7,123,422 B2* | 10/2006 | Suzuki | G02B 15/173 359/557 |
| 7,295,387 B1 | 11/2007 | Ohmori et al. | |
| 7,535,657 B2* | 5/2009 | Kuroda | G02B 15/173 359/676 |
| 7,545,577 B2* | 6/2009 | Hamano | G02B 15/173 359/568 |
| 7,583,449 B2* | 9/2009 | Kusaka | G02B 15/173 359/686 |
| 7,616,385 B2* | 11/2009 | Hamano | G02B 1/041 359/683 |
| 2001/0030809 A1 | 10/2001 | Hayakawa et al. | |
| 2002/0060844 A1 | 5/2002 | Hayakawa et al. | |
| 2003/0076591 A1 | 4/2003 | Ohmori et al. | |
| 2005/0068637 A1 | 3/2005 | Suzuki | |
| 2008/0144188 A1 | 6/2008 | Hamano | |
| 2008/0273249 A1 | 11/2008 | Hamano et al. | |

FOREIGN PATENT DOCUMENTS

| | | |
|---|---|---|
| EP | 1 830 204 A1 | 9/2007 |
| EP | 1 830 205 A1 | 9/2007 |
| JP | 07-013079 A | 1/1995 |
| JP | 08-62541 A | 3/1996 |
| JP | 10-133107 A | 5/1998 |
| JP | 10-148757 A | 6/1998 |
| JP | 2000-227551 A | 8/2000 |
| JP | 2003-098434 A | 4/2003 |
| JP | 2004-117826 A | 4/2004 |
| JP | 2004-117827 A | 4/2004 |
| JP | 2004117826 A * | 4/2004 |
| JP | 2008-151846 A | 7/2008 |
| JP | 2008-209866 A | 9/2008 |

OTHER PUBLICATIONS

Office Action issued Dec. 17, 2014, in Chinese Patent Application No. 201280015726.1.
International Search Report from International Patent Application No. PCT/JP2012/001786, Apr. 17, 2012.
Office Action issued Oct. 20, 2015 in Chinese Patent Application No. 201280015726.1.
Office Action issued Aug. 18, 2015, in Taiwanese Patent Application No. 101111795.
Office Action issued Apr. 14, 2016 in Chinese Patent Application No. 201280015726.1.

* cited by examiner

ZOOM OPTICAL SYSTEM COMPRISING DIFFRACTIVE OPTICAL ELEMENT AND IMAGING DEVICE HAVING THE SAME

TECHNICAL FIELD

The present invention relates to a zoom optical system using a diffractive optical element, and an imaging device including this zoom optical system.

TECHNICAL BACKGROUND

If a diffractive optical element is used in a zoom optical system, chromatic aberration can be easily corrected and high optical performance can be implemented (e.g. see Patent Document 1).

PRIOR ARTS LIST

Patent Document

Patent Document 1: Japanese Laid-Open Patent Publication No. 2004-117826 (A)

SUMMARY OF THE INVENTION

Problems to be Solved by the Invention

Generally, for such an optical system as a digital camera and a video camera, it is expected that the total length of the lens (total optical length, that is a length from a lens surface (surface 1) closest to the object to the image plane) is short and the entire optical system is compact. However as the total length of the lens is decreased, various aberrations, including chromatic aberration, increases and optical performance tends to drop. Even if a diffractive optical element is simply disposed in such an optical system, it is difficult to appropriately correct the chromatic aberration in an entire zoom range unless the disposing position and the refractive power are appropriately set. If the diffractive optical element is inappropriately used, correction of chromatic aberration becomes insufficient. If the refractive power of the diffractive optical element increases, grating pitch of the diffractive optical element becomes finer, hence manufacturing becomes difficult and productivity drops.

With the foregoing in view, it is an object of the present invention to provide a zoom optical system that is compact, corrects various aberrations, including chromatic aberration throughout the entire zoom range, and has high optical performance using a diffractive optical element effectively, and an imaging device having this zoom optical system.

Means to Solve the Problems

To achieve this object, a first aspect of the present invention provides a zoom optical system including, in order from an object: a first lens group having positive refractive power; a second lens group having negative refractive power; a third lens group having positive refractive power; and a fourth lens group having negative refractive power, in which a mutual distance between lens groups changes upon zooming, and one of the third lens group and the fourth lens group includes at least one diffractive optical element.

A second aspect of the present invention provides an imaging device (e.g. digital single-lens reflex camera CAM of this embodiment) that has the zoom optical system according to the above aspect.

Advantageous Effects of the Invention

The present invention can provide a zoom optical system that is compact, appropriately corrects various aberrations, including chromatic aberration throughout the entire zoom range, and has high optical performance using a diffractive optical element effectively, and an imaging device having this zoom optical system.

DESCRIPTION OF THE EMBODIMENTS

Figure 1:
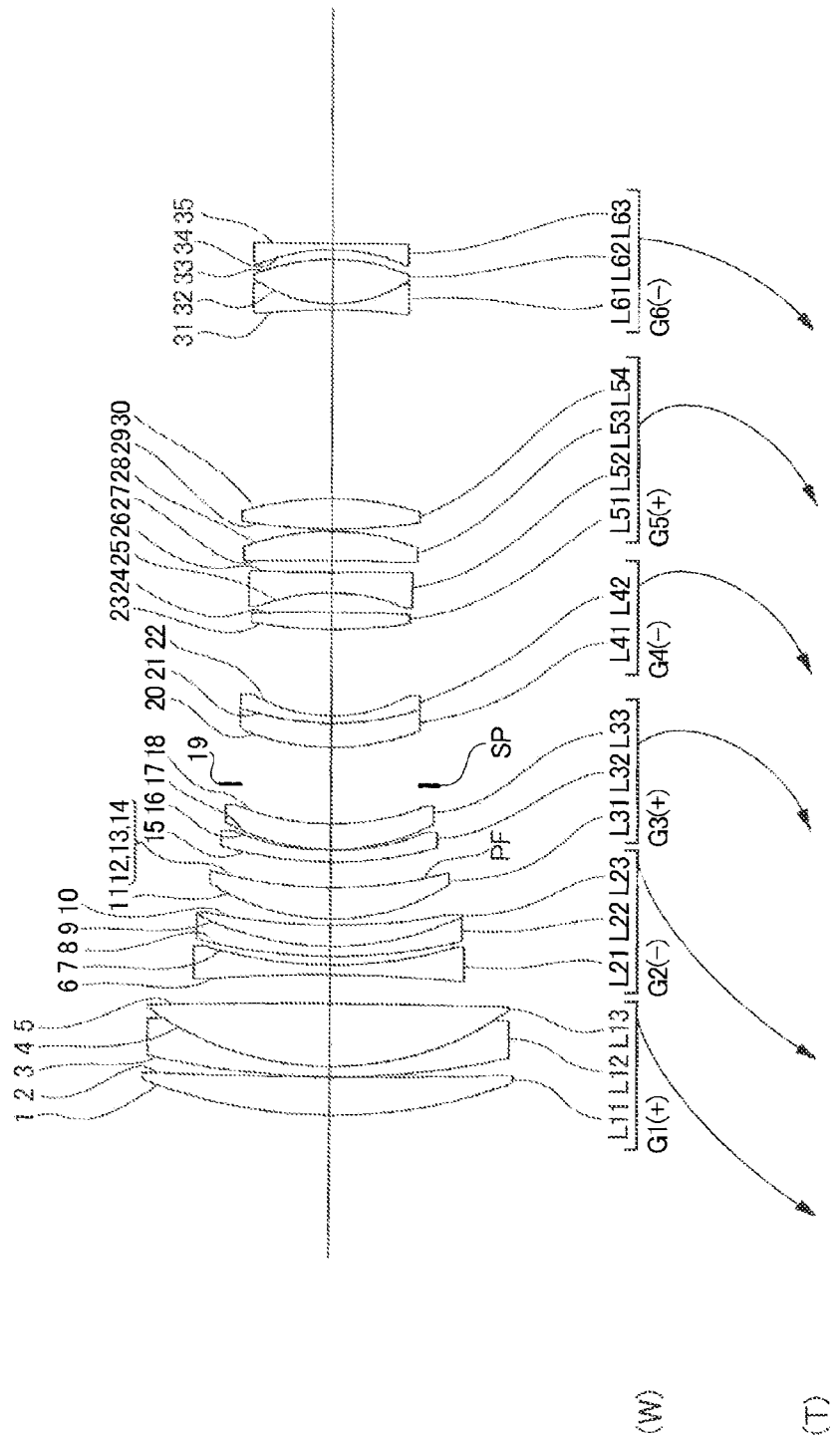
FIG. 1 is a cross-sectional view depicting a configuration of a zoom optical system according to Example 1 in a wide-angle end state, and zoom locus from a wide-angle end state (W) to a telephoto end state (T)

Embodiments of the present invention will now be described. As illustrated in FIG. 1, a zoom optical system ZL according to this embodiment has, in order from an object: a first lens group G1 having positive refractive power; a second lens group G2 having negative refractive power; a third lens group G3 having positive refractive power; and a fourth lens group G4 having negative refractive power, in which a mutual distance between lens groups changes upon zooming from a wide-angle end state to a telephoto end state, and one of the third lens group G3 and the fourth lens group G4 has at least one diffractive optical element PF.

Figure 2:
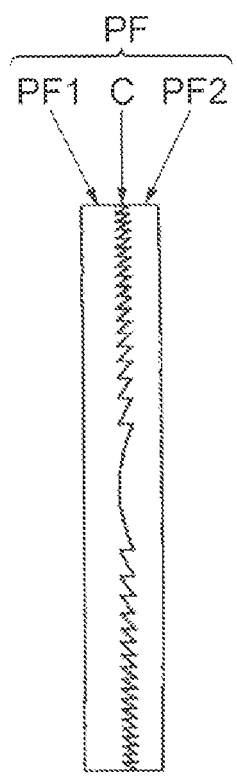
FIG. 2 is a schematic diagram depicting an example of a diffractive optical element according to this embodiment.

In this embodiment, a contact multi-layer type diffractive optical element is used for the diffractive optical element PF, which, as illustrated in FIG. 2, has two diffractive optical elements constituted by mutually different optical materials, which are, in concrete terms, a first diffractive optical element PF1 having a first diffractive optical surface where a plurality of grating grooves are formed, and a second diffractive optical element PF2 having a second diffractive optical surface where a plurality of grating grooves are formed, and the first diffractive optical element PF1 and the second diffractive optical element PF2 are disposed so that the first diffractive optical surface and the second diffractive optical surface face each other and the first diffractive optical surface and the second diffractive optical surface are contacted with each other at the diffractive optical surface C.

The diffractive optical element PF used for this embodiment, however, is not limited to the contact multi-layer type, but may be a single layer type or a separated multi-layer type.

According to the zoom optical system ZL of this embodiment having such a configuration, miniaturization of the zoom lens optical system ZL is implemented by changing the mutual distance of the lens groups G1 to G4 upon zooming from the wide-angle end state to the telephoto end state. A diffractive optical element PF is disposed on either one of the third lens group G3 and the fourth lens group G4 where major longitudinal chromatic aberration is generated, so that chromatic aberration is corrected effectively.

In the later mentioned Example 1, the chromatic aberration is corrected well throughout the entire zoom range by disposing the contact multi-layer type diffractive optical element PF in the third lens group G3. In Example 2, the chromatic aberration is corrected well throughout the entire zoom range by disposing the contact multi-layer type diffractive optical element PF in the fourth lens group G4.

In the zoom optical system ZL according to this embodiment, it is preferable that the third lens group G3 includes, in order from the object, a positive lens, a negative lens and a positive lens, and all these lenses have a meniscus form having a concave surface facing the image. By this configuration, aberrations can be corrected well throughout the entire zoom range.

In the zoom optical system ZL according to this embodiment, it is preferable to satisfy the following conditional expression (1).

$$30 \leq vdave \leq 70 \quad (1)$$

where vdave denotes an average value of Abbe numbers of materials of the positive lenses constituting a lens group including the contact multi-layer type diffractive optical element PF, excluding a lens of which an absolute value of refractive power is 1/5000 or less and the contact multi-layer type diffractive optical element PF.

The conditional expression (1) specifies an average value of Abbe numbers vd of the refractive type lenses, in either the third lens group G3 or the fourth lens group G4 that uses the diffractive optical element PF, excluding a lens of which an absolute value of refractive power is 1/5000 or less.

The diffractive optical element PF has a diffractive optical surface C of which several to several hundred of fine grooves or slits per mm are formed concentrically as a grating structure (see FIG. 2), and has a characteristic to diffract the light that enters the diffractive optical surface C to a direction determined by the grating pitch (distance between grating grooves) and the wavelength of the incident light. This diffractive optical element PF is used, for example, for a lens that collects a diffracted light of a predetermined order to one point.

In the case of a refractive type lens formed of regular optical glass, the change of the refractive power characteristic increases as the wavelength decreases, but in the case of the diffractive optical element PF, the refractive power characteristic linearly changes by the wavelength. The refractive index characteristic of a refraction type lens changes depending on the constituent material, but the refractive index characteristic of the diffractive optical element PF does not change depending on the constituent material. Therefore if a plurality of refraction type lenses which are combined to make the change of refractive power due to the wavelength is linearized, and the diffractive optical element PF are combined, a major achromatic effect is acquired, and chromatic aberrations can be corrected well.

The conditional expression (1) specifies an average value of the Abbe number as a way of selecting a plurality of refraction type lenses of which refractive power linearly changes depending on the wavelength. If the lower limit value of the conditional expression (1) is not reached, the change of the refractive power characteristic increases as the wavelength decreases, and if the diffractive optical element PF is combined with this lens, even more aberrations remain. The refractive power of the diffractive optical element PF to be combined increases and pitch thereof decreases, which means that manufacturing becomes difficult and mass producibility worsens.

If the upper limit value of the conditional expression (1) is exceeded, the glass material having high specific gravity is required and weight increases, since a glass material with high anomalous dispersion properties is used for the refraction type lens. Further, such glass material normally has a row refractive index, which means that correction of spherical aberration or the like becomes difficult. Even if the problem of correcting spherical aberration can be solved by using an aspherical surface, the correction amount on the aspherical surface increases and the sag (deviation of the aspherical surface from the spherical surface) increases accordingly, which makes manufacturing of the lens difficult, and mass producibility worsens.

To demonstrate the effect of this embodiment with more certainty, it is preferable that the lower limit value of the conditional expression (1) is 32. Further, to demonstrate the effect of this embodiment with more certainty, it is preferable that the upper limit value of the conditional expression (1) is 57.

In the zoom optical system ZL according to this embodiment, it is preferable that the following conditional expression (2) is satisfied.

$$0.005 \leq |\phi doei/\phi i| \leq 0.025 \quad (2)$$

where $\phi i$ denotes total refractive power of the lens group including the contact multi-layer type diffractive optical element PF, and $\phi doei$ denotes refractive power of the contact multi-layer type diffractive optical element PF.

The conditional expression (2) specifies a ratio of the refractive power of the diffractive optical element PF and the refractive power of the lens group including this diffractive optical element PF. If the lower limit value of the conditional expression (2) is not reached, the refractive power of the diffractive optical element PF becomes small and chromatic aberration cannot be corrected sufficiently. If the upper limit value of the conditional expression (2) is exceeded, the refractive power of the diffractive optical element PF becomes strong, and the grating pitch of the diffractive optical element PF becomes fine, which makes manufacturing of the lens difficult and mass producibility worsens.

To demonstrate the effect of this embodiment with more certainty, it is preferable that the lower limit value of the conditional expression (2) is 0.010. Further, to demonstrate the effect of this embodiment with more certainty, it is preferable that the upper limit value of the conditional expression (2) is 0.020.

In the zoom optical system ZL according to this embodiment, it is preferable that the following conditional expression (3) is satisfied.

$$0.8 \leq TLw/fw \leq 1.3 \quad (3)$$

where TLw denotes a distance from a lens surface closest to the object to the image plane in the wide-angle end state, and fw denotes a focal length of the zoom optical system in the wide-angle end state.

The conditional expression (3) specifies a ratio of the distance from the lens surface closest to the object (surface 1) to the image plane in the wide-angle end state, and the focal length of the zoom optical system in the wide-angle end state. If the lower limit value of the conditional expression (3) is not reached, various aberrations deteriorate. If the upper limit value of the conditional expression (3) is exceeded, the zoom optical system cannot be miniaturized sufficiently.

To demonstrate the effect of this embodiment with more certainty, it is preferable that the lower limit value of the conditional expression (3) is 1.0. Further, to demonstrate the effect of this embodiment with more certainty, it is preferable that the upper limit value of the conditional expression (3) is 1.2.

In the zoom optical system ZL according to this embodiment, it is preferable that the fourth lens group G4 includes at least one lens having positive refractive power and at least one lens having negative refractive power. According to this configuration, generation of the longitudinal chromatic aberration can be suppressed while suppressing the spherical aberration, coma aberration, astigmatism, curvature of field or the like. Furthermore, a major achromatic effect can be demonstrated when the diffractive optical element PF is combined, since the change of the refractive power depending on the wavelength of the refraction type lens can be more linearized, hence chromatic aberration of the optical system can be corrected well.

In the zoom optical system ZL according to this embodiment, it is preferable that the following conditional expression (4) is satisfied.

$$0.08 \leq Pmin \leq 0.5 \quad (4)$$

where Pmin denotes a minimum pitch of the contact multi-layer type diffractive optical element PF.

The conditional expression (4) specifies the minimum pitch of the grating of the diffractive optical element PF. If the lower limit value of the conditional expression (4) is not reached, the pitch becomes small, which makes manufacturing difficult and deteriores mass producibility. If the upper limit value of the conditional expression (4) is exceeded, the refractive power of the diffractive optical element PF decreases, and the chromatic aberration is not corrected sufficiently.

To demonstrate the effect of this embodiment with more certainty, it is preferable that the lower limit value of the conditional expression (4) is 0.2.

In the zoom optical system ZL according to this embodiment, it is preferable that the first lens group G1 includes at least one lens having positive refractive power, and at least one thereof is anomalous dispersion glass. By using the anomalous dispersion glass for at least one positive lens, out of the first lens group G1 like this, the generation of the longitudinal chromatic aberration and lateral chromatic aberration can be suppressed.

Figure 8:
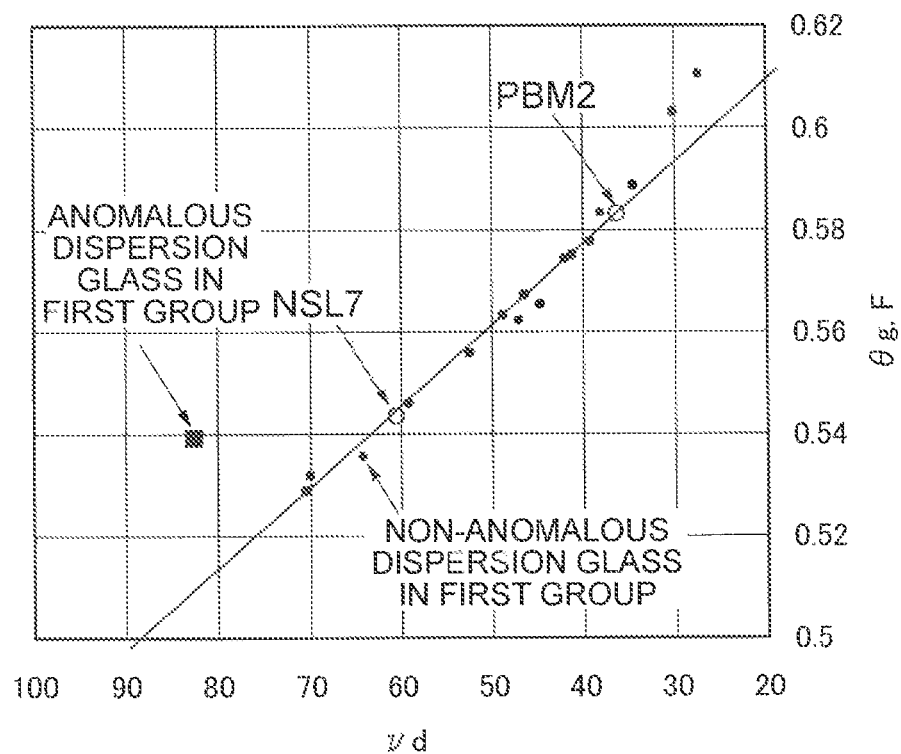
FIG. 8 is a graph for describing the definition of an anomalous dispersion glass, where the abscissa indicates an Abbe number and the ordinate indicates a partial dispersion ratio.

Generally with most optical glass, an approximately linear relationship is established between the partial dispersion ratio and the Abbe number, as shown in FIG. 8, where the ordinate indicates the partial dispersion ratio ($\theta g$, F) and the abscissa indicates the Abbe number vd. This type of glass is called "normal dispersion glass". On the other hand, a type of glass that deviated from the linear relationship is called "anomalous dispersion glass". In concrete terms, when the line connecting NSL7 and PBM2 (both glass type names from Ohara Inc.) is regarded as a standard line, and the deviation of the partial dispersion ratio from this standard line is denoted with $\Delta(\theta g, F)$, the glass that satisfies the following conditional expression (5) or (6) is defined as anomalous dispersion glass.

$$\Delta(\theta g, F) < -0.012 \quad (5)$$

$$\Delta(\theta g, F) > 0.012 \quad (6)$$

The partial dispersion ratio ($\theta g$, F) is defined as ($\theta g$, F)=(ng−nF)/(nF−nC), where ng denotes a refractive index with respect to the g-line (wavelength $\lambda$=435.835 nm) of the material of the lens, nF denotes a refractive index with respect to the F-line (wavelength $\lambda$=486.133 nm) and nC denotes a refractive index with respect to the C-line (wavelength $\lambda$=656.273 nm).

The above mentioned NSL7, which is the standard of normal dispersion glass, has the partial dispersion ratio 0.5436 and the Abbe number 60.49, and PBM2 has the partial dispersion ratio 0.5828 and the Abbe number 36.26.

In the zoom optical system ZL according to this embodiment, it is preferable that the third lens group G3 includes at least one aspherical surface. According to this configuration, spherical aberration and coma aberration can be corrected well.

In the zoom optical system ZL according to this embodiment, it is preferable that the fourth lens group G4 includes at least one aspherical surface. According to this configuration, spherical aberration and coma aberration can be corrected well.

It is preferable that the zoom optical system ZL according to this embodiment further includes a fifth lens group G5 having positive refractive power and a sixth lens group G6 having negative refractive power, which are sequentially disposed to the image side of the fourth lens group G4. According to this configuration, the zoom lens optical system ZL can be further miniaturized.

In the zoom optical system ZL according to this embodiment, it is preferable that the sixth lens group G6 includes at least one aspherical surface. According to this configuration, astigmatism, curvature of field and distortion can be corrected well.

If the diffractive optical element PF of this embodiment is the multi-layer (or stacked) diffractive optical element, that is the diffractive optical element including the first diffractive optical element PF1 having the first diffractive optical surface and the second diffractive optical element PF2, where the first diffractive optical element PF1 and the second diffractive optical element PF2 are disposed such that the first diffractive optical surface and the second diffractive optical surface face each other, then the diffraction efficiency can be increased in a wide wavelength region, including the g-line (wavelength $\lambda$=435.853 nm) to the C-line (wavelength $\lambda$=635.273 nm). Therefore the zoom optical system ZL according to this embodiment using such a diffractive optical element PF can be used in a wide wavelength region.

In this embodiment, the diffraction efficiency indicates a ratio $\eta$ of the incident intensity I0 and the intensity I1 of the first order diffracted light (=I1/I0×100 [%]), if the first order diffracted light is used in the transmission type diffractive optical element PF.

In the diffractive optical element PF used for the zoom optical system ZL according to this embodiment, the first diffractive optical surface and the second diffractive optical surface, which are disposed to face each other as mentioned above, may contact with each other. In other words, a contact multi-layer type diffractive optical element may be constructed by contacting grating grooves formed in the two diffractive element members respectively with each other. Compared with a separated multi-layer type diffractive optical element where two diffractive element members, on which grating grooves are formed respectively, are disposed in proximity to each other so that the grating grooves face each other, the manufacturing steps are simplified in the case of the contact multi-layer type diffractive optical element, therefore mass production efficiency is high, and diffraction efficiency with respect to the incident angle of the beam is good (90% or more in the wide wavelength region, including the g-line to the C-line). Therefore in the case of the zoom optical system ZL according to this embodiment using the contact multi-layer type diffractive optical element, manufacturing is easy and diffraction efficiency is improved.

In the zoom optical system ZL according to this embodiment, at least one of the first diffractive optical element PF1 and the second diffractive optical element PF2 constituting the diffractive optical element PF may be constituted by ultraviolet curing resin. By this configuration, mass producibility and productivity of the diffractive optical element PF can be enhanced. Therefore mass producibility and productivity of the zoom optical system ZL according to this embodiment using this diffractive optical element PF can be enhanced.

To be more specific, the diffractive optical element PF can be manufactured using a general glass or thermoplastic or thermosetting resin that can be injection-molded as a material for one of the two diffractive element members, and using the ultraviolet curing resin for the other. For example, if glass is used for a material of one of the diffractive element members, a manufacturing method of forming the diffractive optical surface C by cutting and polishing, then dropping the ultraviolet curing resin onto the diffractive optical surface C, and curing the resin by irradiating ultraviolet rays, can be used. If thermoplastic resin or thermosetting resin is used as the material of one of the diffractive element members, a manufacturing method of molding the diffractive optical surface C by performing injection molding or the like using a die in which the diffraction grooves are formed, then dropping ultraviolet curable resin onto the diffractive optical surface C, and curing the resin by irradiating ultraviolet rays, can be used. Because of these manufacturing methods, operation of separately creating diffractive optical surfaces C of the two diffractive element members and aligning the positions of these diffractive optical surfaces C is unnecessary, hence the mass producibility and productivity of the diffractive optical element PF can be enhanced.

In the zoom optical system ZL according to this embodiment, the first diffractive optical element PF1 and the second diffractive optical element PF2 constituting the diffractive optical element PF may be constituted by two types of ultraviolet curing resin having mutually different optical characteristics. By this configuration, the mass producibility and productivity of the diffractive optical element PF can be enhanced. Therefore mass producibility and productivity of the zoom optical system ZL according to this embodiment using this diffractive optical element PF can be enhanced.

In this case, one of the diffractive element members having the diffractive optical surface C is molded by pressing a die, on which the grating groves are formed, against one of the ultraviolet curing resins dropped onto the substrate, and irradiating ultraviolet rays from the opposite direction of the die, so as to form one of the diffractive element members. Then the die is removed and the other ultraviolet curable resin is dropped onto the diffractive optical surface C, which is cured by the ultraviolet irradiation. Then the other dropped ultraviolet curing resin is cured by irradiating ultraviolet rays on this resin, so as to form the other diffracted element member. By using this manufacturing method, the grating grooves can be molded using only one die, and it is unnecessary to separately forming the diffractive optical surfaces C of the two diffractive element members and aligning the positions of these diffractive optical surfaces, and executing operation of dropping the ultraviolet curing resin and curing the resin only twice is sufficient. Therefore the mass producibility and productivity of the diffractive optical element PF can be further enhanced.

In the zoom optical system ZL according to this embodiment, it is preferable that the following conditional expressions (7) to (10) are satisfied, where nd1, nF1 and nC1 denote the refractive indexes of a material of a diffractive element member having a lower refractive index and a higher dispersion, out of the two diffractive optical element members constituting the diffractive optical element PF with respect to the d-line (wavelength: 587.562 nm), F-line (wavelength: 486.133 m) and C-line (wavelength: 656.273 nm), and nd2, nF2 and nC2 denote the refractive indexes of a material of the other diffractive element member having a higher refractive index and a lower dispersion, with respect to the d-line, F-line and C-line.

$$nd1 \leq 1.54 \tag{7}$$

$$0.0145 \leq nF1 - nC1 \tag{8}$$

$$1.55 \leq nd2 \tag{9}$$

$$nF2 - nC2 \leq 0.013 \tag{10}$$

The conditional expressions (7) to (10) specify the refractive index with respect to the d-line and the refractive index difference (nF−nC) with respect to the F-line and the C-line of the optical materials used for the two different diffractive element members constituting the diffractive optical element PF of the zoom optical system ZL, that is the two different resins. To be more specific, the conditional expressions (7) to (10) specify the optical characteristics of the resin that must be satisfied after being cured to manufacture the diffractive optical element PF in the two different types of resins used for the diffractive optical element PF, that is the resin of which optical characteristics are a relatively low refractive index and a high dispersion, and the resin of which optical characteristics are a relatively high refractive index and a low dispersion.

To satisfy the conditional expression (7) to (10), the diffractive optical surface C can be formed by contacting and cementing the two different diffractive element members to demonstrate better performance. As a result, 90% or higher diffraction efficiency can be implemented throughout a wide wavelength region from the g-line to the C-line. However, if the upper limit values of the conditional expressions (7) to (10) are exceeded or if the lower limit values thereof are not reached, then 90% or higher diffraction efficiency cannot be obtained in the wide wavelength region, and maintaining the advantage of the contact multi-layer type diffraction optical element PF becomes difficult. The diffraction efficiency here refers to a ratio of the intensity of the incident light and the intensity of the first order diffracted light, as mentioned above.

To be sure, expressions to determine the diffraction efficiency are mentioned here. The diffraction efficiency is given by the following expressions (11) and (12), where m denotes the order of diffraction, η denotes the diffraction efficiency of the diffracted light of the m-th order, d1 denotes the height of the diffraction grating of one diffractive element member constituting the diffractive optical surface C, d2 denotes the height of the diffraction grating of the other diffractive element member constituting the diffractive optical surface C, n1 denotes a refractive index of the material of one diffractive element member constituting the diffractive optical surface C, n2 denotes a refractive index of the material of the other diffractive element member constituting the diffractive optical surface C, and λ denotes the wavelength.

$$\eta m = \{\sin(a-m)\pi/(a-m)\pi\}^2 \quad (11)$$

$$a = \{(n1-1)d1 - (n2-1)d2\}/\lambda \quad (12)$$

The resins that satisfy the above conditions and a method of manufacturing the contact multi-layer type diffractive optical element PF using these resins have been disclosed in, for example, European Patent Publication No. 1830204, and European Patent Publication No. 1830205.

In this embodiment, the contact multi-layer type diffractive optical element PF, constituted by mutually different ultraviolet curable resins, is used in each example to be described later, and the height of the diffraction grating is 20.05 μm, the first order diffraction efficiency is 98% at the g-line (wavelength λ=435.835 nm), 98% at the F-line (wavelength λ=486.133 nm), 100% at the d-line (wavelength λ=587.562 nm), and 98% at the C-line (wavelength λ=656.273 nm).

Figure 9:
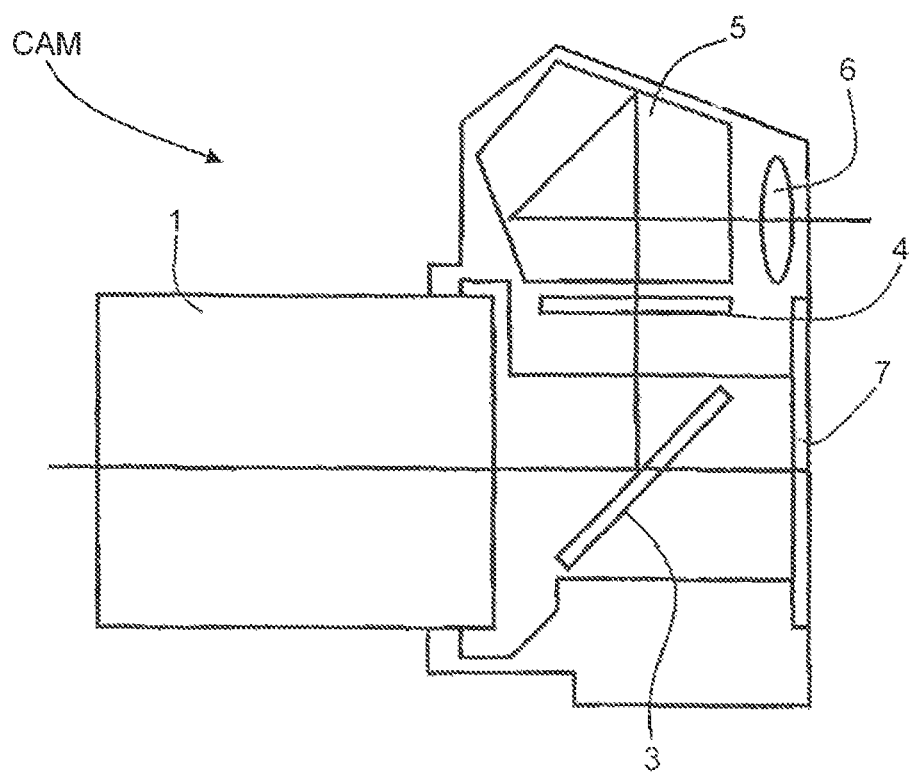
FIG. 9 is a schematic cross-sectional view depicting a configuration of a digital single-lens reflex camera (imaging device) according to this embodiment.

FIG. 9 is a cross-sectional view depicting a digital single-lens reflex camera CAM (imaging device) including the zoom optical system ZL as an imaging lens 1. In this camera CAM, the light from an object (not illustrated) is collected by an imaging lens 1 and forms an image on a focal plane plate 4 via a quick return mirror 3. The light that formed an image on the focal plane plate 4 is reflected for a plurality of times in a penta prism 5, and is guided to an eye piece 6. Thereby the user can observe the object image as an erected image via the eye piece 6.

If the user presses a release button (not illustrated), the quick return mirror 3 is retracted out of the optical path, and the light from the object (not illustrated), collected by the imaging lens 1, forms an object image on a picture element 7. Thereby the light from the object is imaged by the picture element 7, and is recorded in a memory (not illustrated) as an object image. Thus the user can image the object using the camera CAM.

The camera CAM illustrated in FIG. 9 may removably hold the imaging lens 1, or may be integrated with the imaging lens 1. The camera CAM may be a single-lens reflex camera, or a compact camera which does not include the quick return mirror or the like.

As each example to be described below shows, the zoom optical system ZL according to this embodiment, which is included in this camera CAM as the imaging lens 1, is compact, and can correct various aberrations well, including chromatic aberration, throughout the entire zoom range, and has high optical performance due to the characteristics of the lens configuration. Therefore this camera CAM can correct various aberrations well, including chromatic aberration, and implement an imaging device having high optical performance.

EXAMPLES

Each example of the present embodiment will now be described with reference to the drawings. Table 1 and Table 2 shown below are tables of each data of Example 1 and Example 2.

In [General Data] in each table, f denotes each value of the focal length (mm) of the zoom optical system ZL at the d-line in the wide-angle end state and the telephoto end state, FNo denotes an F number in the wide-angle end state and the telephoto end state, Y denotes an image height, and Σd denotes a distance on the optical axis from a lens surface (surface 1) closest to the object in the zoom optical system ZL to the lens surface closest to the image.

In [Lens Data] in each table, the surface number indicates a sequence of the lens surface from the object side along the beam traveling direction, r denotes a radius of curvature of the lens surface, d denotes a distance from each optical surface to the next optical surface (or the image plane) on the optical axis, νd denotes a refractive index at the d-line (wavelength: 587.562 nm), νd denotes an Abbe number at the d-line, (variable) denotes a variable surface distance, *a denotes an aspherical surface, *d denotes the diffractive optical surface, *s denotes an aperture stop, and "∞" in the radius of curvature r denotes a plane. The refractive index of air (d-lire) 1.000000 is omitted.

In [Aspherical Data] in each table, the form of the aspherical surface shown in [Lens Data] is indicated by the following expression (a). Here h denotes a height in a direction perpendicular to the optical axis, Z(h) denotes a displacement (sag) in the optical axis direction at the height h, c denotes a radius of curvature (paraxial radius of curvature) of the reference spherical surface, κ denotes a conical coefficient, A denotes an aspherical coefficient to the fourth degree, and B denotes an aspherical coefficient to the sixth degree.

In this embodiment, "E-n" indicates "×10$^{-n}$", and for example "1.234E-05" indicates "1.234×10$^{-5}$".

$$Z(h) = ch^2/[1+(1-(1+\kappa)c^2h^2)^{1/2}] + Ah^4 + Bh^6 \quad (a)$$

In [Diffractive Optical Surface Data] in each table, the form of the diffractive optical surface shown in [Lens Data] is indicated by the following expression (b). Here h denotes height in a direction perpendicular to the optical axis, φ(h) denotes a phase function of the diffractive optical element, λ denotes a wavelength of the incident light, C2 denotes a phase difference coefficient to the second degree, and C4 denotes a phase difference coefficient to the fourth degree.

$$\#(h) = (2\pi/\lambda)\cdot(C2h^2 + C4h) \quad (b)$$

In [Partial Dispersion Ratio and Deviation of Positive Lens of First Lens Group G1] in each table, (θg, F) denotes a partial dispersion ratio, and Δ(θg, F) denotes a deviation of a partial dispersion ratio from the standard line to be a reference of a normal dispersion glass, which is a line connecting NSL7 and PBM2.

In [Each Group Distance Data], Di (i is an integer) denotes a variable distance between surface i and surface (i+1) in the wide-angle end state and the telephoto end state.

In [Zoom Optical System Group Data] in each table, G denotes a group number, first surface of group denotes a surface number of the lens closest to the object in each lens group, and group focal distance denotes a focal distance of each lens group.

In [Conditional Expression] in each table, a correspondence value of each conditional expression (1) to (4) is shown.

In all the data values, "mm" is used unless otherwise specified as the unit of focal length f, radius of curvature r, surface distance d and other lengths, but unit is not limited to "mm", since an equivalent optical performance is obtained if an optical system is proportionally expanded or proportionally reduced. The unit is not limited to "mm", but another appropriate unit may be used.

The above description is the same for the other examples, where description is omitted.

Example 1

Example 1 will be described with reference to FIG. 1, FIG. 3, FIG. 4 and Table 1. FIG. 1 is a cross-sectional view depicting a configuration of a zoom optical system ZL (ZL1) according to Example 1, and a zoom locus from the wide-angle end state (W) to the telephoto end state (T). In the cross-sectional view depicting the configuration in FIG. 1, the reference symbols PF1 and PF2 of the diffractive optical element members constituting the diffractive optical element PF, the reference symbol C of the diffractive optical surface, and the form of the grating grooves, are omitted to simplify illustrations, and only the reference symbol PF of the diffractive optical element PF is included.

As illustrated in FIG. 1, a zoom optical system ZL1 according to Example 1 includes, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, and performs zooming by changing an air distance between each lens group.

The first lens group G1 includes, in order from the object, a positive lens L11, and a cemented lens of a negative lens L12 and a positive lens L13. The material constituting the positive lens L13 disposed to the image side is anomalous dispersion glass.

The second lens group G2 includes, in order from the object, a negative lens L21, and a cemented lens of a negative lens L22 and a positive lens L23.

The third lens group G3 includes, in order from the object, a positive lens L31, a negative lens L32 and a positive lens L33, and all these lenses have a meniscus form having a concave surface facing the image. A contact multi-layer type diffractive optical element PF is formed on the image side surface of the positive lens L31 disposed to the object side, and the image side surface of the positive lens L33 disposed to the image side is aspherical.

The diffractive optical element PF is constituted by a diffractive optical element members PF1 and PF2 which are formed of mutually different ultraviolet curing resins, and are contacted and cemented to each other, and the cementing surface thereof is a diffractive optical surface C where the diffraction grating grooves are formed (see FIG. 2). In this example, resins having a refractive index indicated in [the resin refractive index] in each table is used for a material constituting the diffractive optical element members PF1 and P12. The refractive index of the resin indicates the refractive index after the resin is cured.

The fourth lens group G4 includes a cemented lens in which a positive lens L41 and a negative lens L42 are cemented in order from the object. The image side surface of the negative lens L42 is aspherical.

The fifth lens group G5 includes, in order from the object, a positive lens L51, a negative lens L52, a positive lens L53 and a positive lens L54.

The sixth lens group G6 includes, in order from the object, a cemented lens of a positive lens L61 and a negative lens L62, and a negative lens L63. The image side surface of the negative lens L62 disposed to the image side is aspherical.

Table 1 below shows a value of each data according to Example 1. The surface numbers 1 to 35 in Table 1 correspond to the surfaces 1 to 35 in FIG. 1.

TABLE 1

[General Data]

| | Wide-angle end | Telephoto end |
|---|---|---|
| f = | 200~ | 400 |
| FNo = | 4.0~ | 5.8 |
| Y = | 21.6~ | 21.6 |
| Σd = | 172.7~ | 219.8 |

[Lens Data]

| Surface number | r | d | nd | vd |
|---|---|---|---|---|
| 1 | 102.271 | 7.50 | 1.51680 | 64.10 |
| 2 | 822.211 | 0.15 | | |
| 3 | 162.071 | 2.00 | 1.70154 | 41.17 |
| 4 | 62.075 | 12.40 | 1.49782 | 82.52 |
| 5 | −1860.417 | D5(Variable) | | |
| 6 | −326.365 | 2.00 | 1.58267 | 46.48 |
| 7 | 86.313 | 1.72 | | |
| 8 | 109.228 | 2.00 | 1.51742 | 52.31 |
| 9 | 59.716 | 4.20 | 1.75520 | 27.51 |
| 10 | 128.984 | D10(Variable) | | |
| 11 | 43.491 | 6.20 | 1.53172 | 48.87 |
| 12 | 89.245 | 0.01 | 1.52780 | 33.41 |
| 13*d | 89.245 | 0.01 | 1.55710 | 49.74 |
| 14 | 89.245 | 5.06 | | |
| 15 | 77.236 | 2.20 | 1.69895 | 30.13 |
| 16 | 49.645 | 0.32 | | |
| 17 | 43.955 | 5.00 | 1.51823 | 58.94 |
| 18*a | 51.848 | 7.74 | | |
| 19*s | ∞ | D19(Variable) | | |
| 20 | 46.464 | 4.82 | 1.63980 | 34.56 |
| 21 | 56.652 | 1.44 | 1.62374 | 47.04 |
| 22*a | 30.246 | D22(Variable) | | |
| 23 | 100.205 | 3.38 | 1.66755 | 41.96 |
| 24 | −537.950 | 3.89 | | |
| 25 | −38.739 | 4.03 | 1.72342 | 37.95 |
| 26 | 764.272 | 2.25 | | |
| 27 | −1006.785 | 5.88 | 1.51860 | 69.98 |
| 28 | −48.618 | 0.45 | | |
| 29 | 112.908 | 6.00 | 1.48749 | 70.41 |
| 30 | −62.228 | D30(Variable) | | |
| 31 | −125.593 | 1.20 | 1.74400 | 44.78 |
| 32 | 26.854 | 8.80 | 1.59551 | 39.22 |
| 33 | −40.399 | 1.92 | | |
| 34 | −36.786 | 1.20 | 1.51860 | 69.98 |
| 35*a | 601.439 | | | |

[Aspherical Data]

Surface 18  κ = 2.8008E−01,  A = 9.0366E−07,  B = 9.1997E−11
Surface 22  κ = 4.1203E−02,  A = −1.6376E−06,  B = −9.2471E−10
Surface 35  κ = 2.2791E+03,  A = −1.3567E−06,  B = −4.1417E−09

[Diffractive Optical Surface Data]

Surface 13  C2 = −3.2189E−05, C4 = 1.5067E−09

[Diffractive Optical Element Optical Data]

| | nC | nd | nF | ng |
|---|---|---|---|---|
| Low refractive index | 1.523300 | 1.527800 | 1.539100 | 1.549100 |
| High refractive index | 1.553800 | 1.557100 | 1.565000 | 1.571300 |

[Partial dispersion ratio and deviation of positive lens of first lens group G1]

Positive lens L11 (normal dispersion glass)

(θg, F) = 0.5357, Δ(θg, F) = −0.0021
Positive Lens L13 (anomalous dispersion glass)

(θg, F) = 0.5390, Δ(θg, F) = 0.0310

TABLE 1-continued

[Inter-group Distance Data]

| | Wide-angle end | Telephoto end |
|---|---|---|
| D5 | 5.72 | 32.95 |
| D10 | 1.21 | 43.07 |
| D19 | 7.41 | 4.12 |
| D22 | 17.16 | 35.04 |
| D30 | 37.40 | 0.83 |

[Zoom Optical System Group Data]

| Group number | First surface of group | Group focal length |
|---|---|---|
| G1 | 1 | 174.2 |
| G2 | 6 | −177.2 |
| G3 | 11 | 231.6 |
| G4 | 20 | −165.4 |
| G5 | 23 | 80.9 |
| G6 | 31 | −86.2 |

[Conditional Expressions]

| | |
|---|---|
| Conditional Expression (1) | νdave = 53.9 |
| Conditional Expression (2) | \|φdoei/φi\| = 0.0149 |
| Conditional Expression (3) | TLw/fw = 1.096 |
| Conditional Expression (4) | Pmin = 0.455 |

As the data in Table 1 shows, the zoom optical system ZL1 according to this example satisfies all the conditional expressions (1) to (4).

Figure 3:
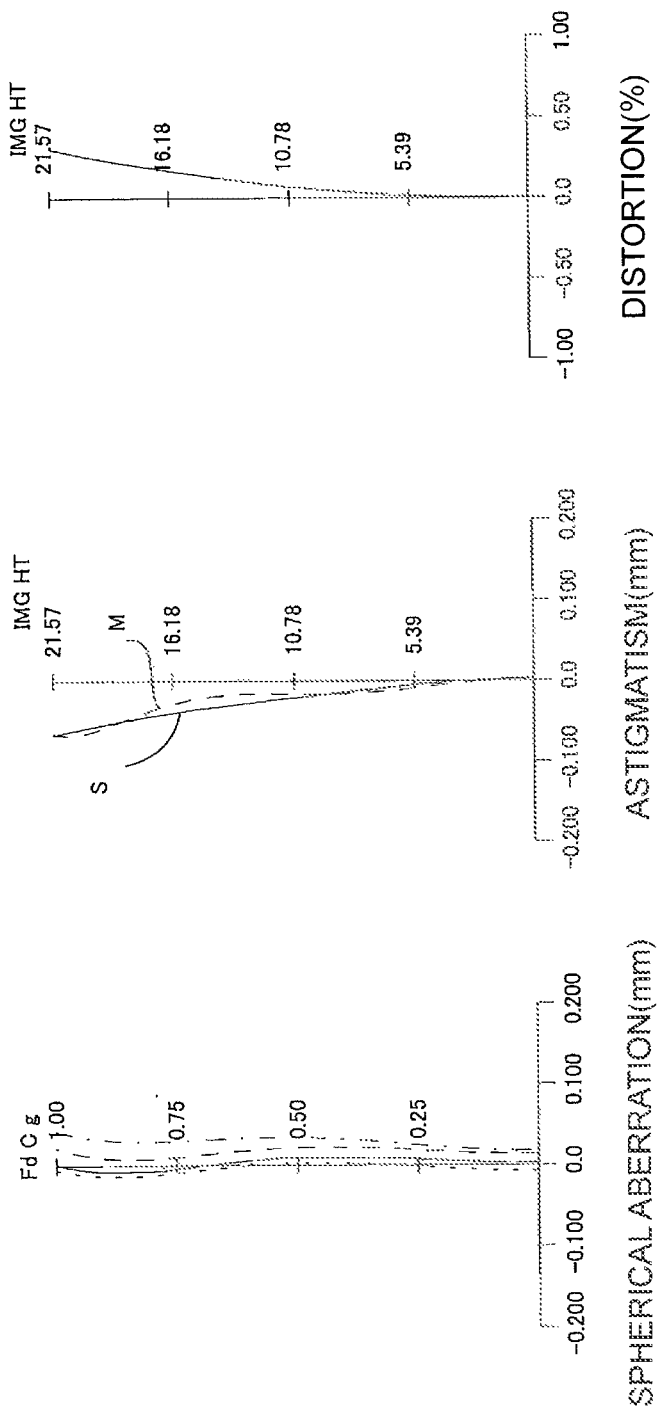
FIG. 3 are diagrams depicting longitudinal aberrations of the zoom optical system according to Example 1 upon focusing on infinity in the wide-angle end state.
Figure 4:
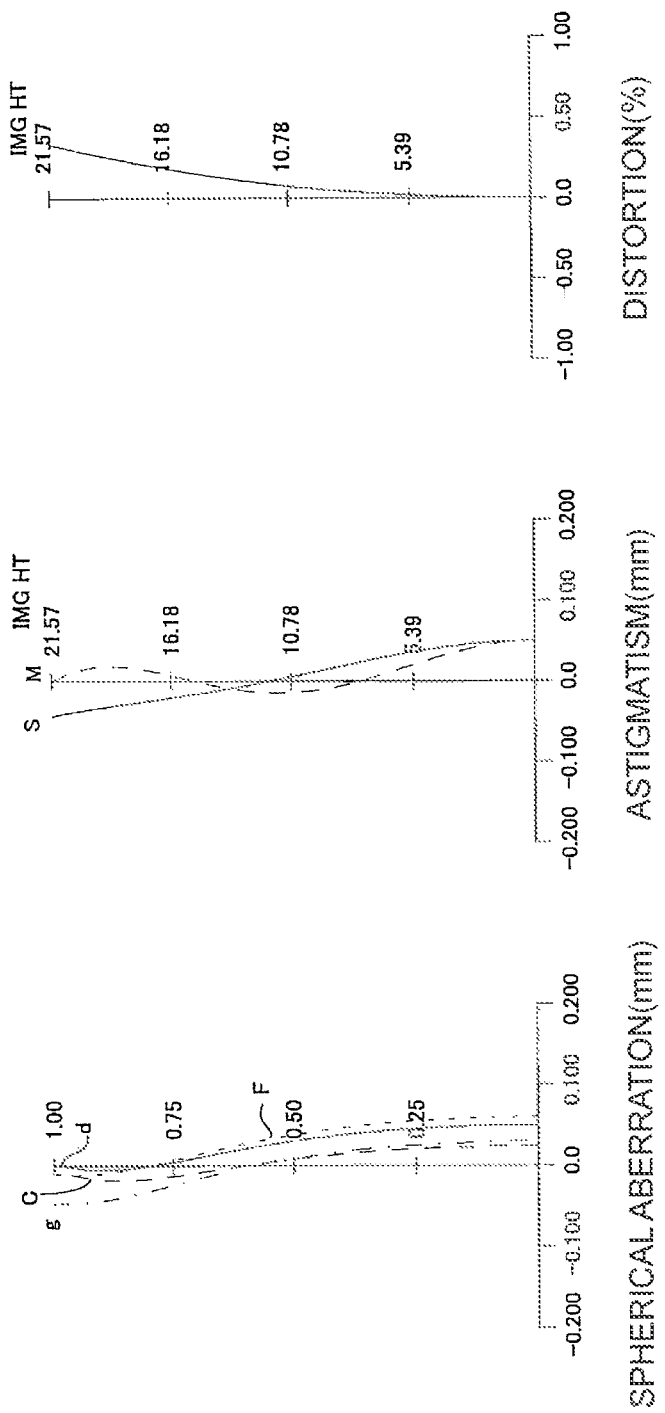
FIG. 4 are diagrams depicting longitudinal aberrations of the zoom optical system according to Example 1 upon focusing on infinity in the telephoto end state.

FIG. 3 and FIG. 4 are graphs showing various aberrations of the zoom lens system ZL according to Example 1. FIG. 3 are graphs showing various longitudinal aberrations of the zoom lens system upon focusing on infinity in the wide-angle end state, and FIG. 4 are graphs showing various longitudinal aberrations of the zoom lens system upon focusing on infinity in the telephoto end state. In each graph showing the longitudinal aberrations, spherical aberration, astigmatism and distortion (in longitudinal direction) are shown sequentially from the left. Each of the graph shows ray tracing from the object side, performed in the zoom optical system ZL1 according to Example 1.

In each graph showing aberrations, d denotes aberrations at the d-line, C denotes aberrations at the C-line, F denotes aberrations at the F-line, and g denotes aberrations at the g-line. In graphs showing astigmatism, the solid line indicates the sagittal image surface, and the broken line indicates the meridional image surface. In graphs showing spherical aberrations, the ordinate indicates a value normalized with the maximum value of the radius of the entrance pupil as 1, and the abscissa indicates the value of the aberration (mm) at each line. In the graphs showing astigmatism, the ordinate indicate the image height (mm) and the abscissa indicates the value of the aberration (mm). In the graphs showing distortion, the ordinate indicates the image height (mm), and the abscissa indicates the ratio of the aberration by percentage (%). The description on the graphs showing aberrations is the same as for other examples, where the description is omitted.

As each graph showing aberrations clarifies, in the zoom optical system according to Example 1, various aberrations, including spherical aberration, astigmatism and distortion are corrected well in each focal length state from the wide-angle end state to the telephoto end state.

Example 2

Figure 5:
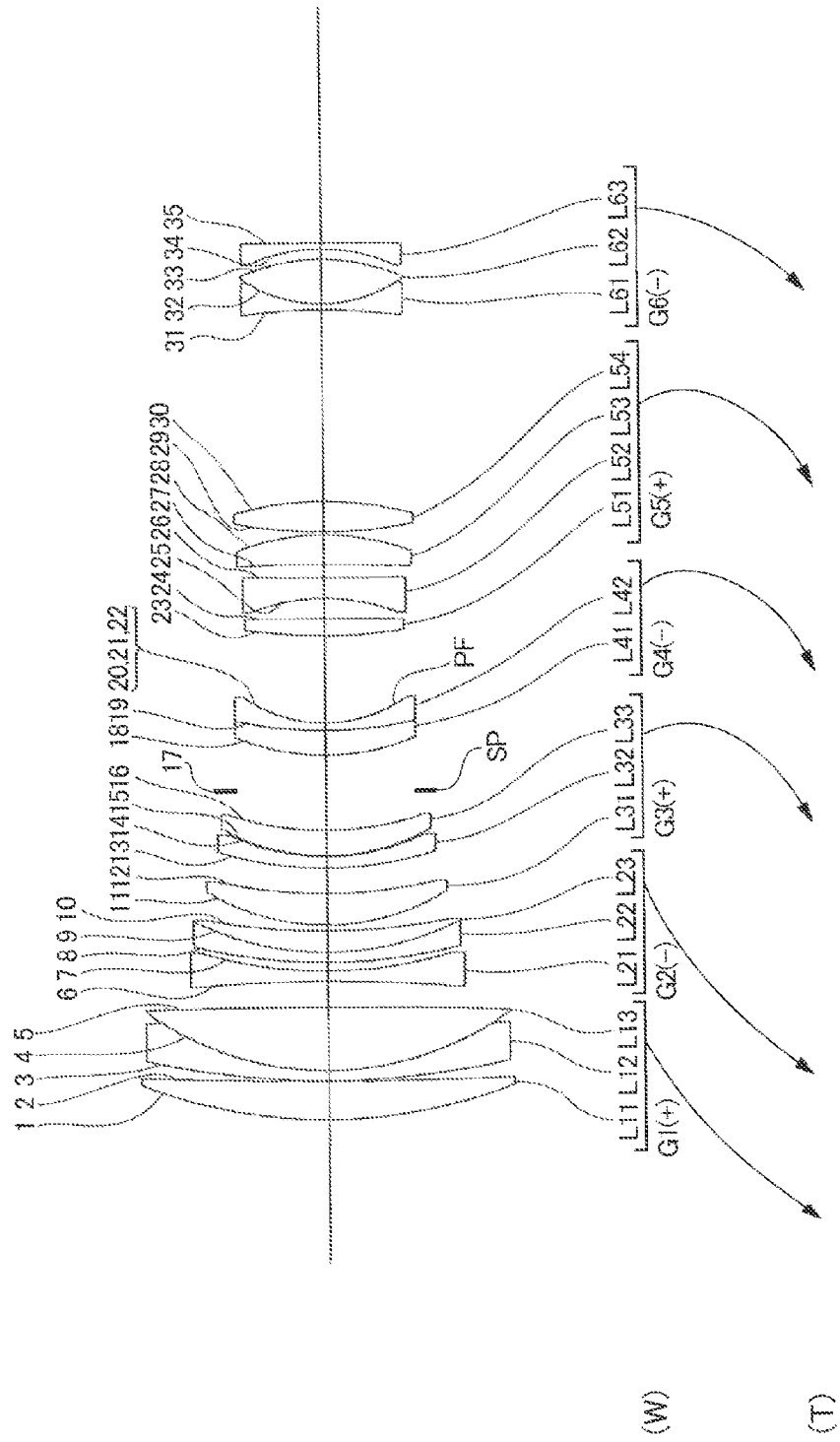
FIG. 5 is a cross-sectional view depicting a configuration of a zoom optical system according to Embodiment 2 in a wide-angle end state, and zoom locus from a wide-angle end state (W) to a telephoto end state (T)

Example 2 will be described with reference to FIG. 5 to FIG. 7 and Table 2. FIG. 5 is a cross-sectional view depicting a configuration of a zoom optical system ZL (ZL2) according to Example 2, and a zoom locus from the wide-angle end state (W) to the telephoto end state (T). In the cross-sectional view depicting the configuration in FIG. 5, the reference symbols PF1 and PF2 of the diffractive optical element members constituting the diffractive optical element PF, the reference symbol C of the diffractive optical surface, and the form of the grating grooves are omitted to simplify illustration, and only the reference symbol PF of the diffractive optical element PF is included.

As illustrated in FIG. 5, the zoom optical system ZL2 according to Example 2 includes, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, and performs zooming by changing the air distance between each lens group.

The first lens group G1 includes, in order from the object, a positive lens L11, and a cemented lens of a negative lens L12 and a positive lens L13. The material constituting the positive lens L13 disposed to the image side is anomalous dispersion glass.

The second lens group G2 includes, in order from the object, a negative lens L21, and a cemented lens of a negative lens L22 and a positive lens L23.

The third lens group G3 includes, in order from the object, a positive lens L31, a negative lens L32 and a positive lens L33, and all these lenses have a meniscus form having a concave surface facing the image. The image side surface of the positive lens L31 disposed to the object side, and the image side surface of the positive lens L33 disposed to the image side are both aspherical.

The fourth lens group G4 includes a cemented lens in which a positive lens L41 and a negative lens L42 are cemented in order from the object. On the image side surface of the negative lens L42, a contact multi-layer type diffractive optical element PF is formed. The image side surface of the contact multi-layer type diffractive optical element PF is aspherical.

The diffractive optical element PF is constituted by a diffractive optical element members PF1 and PF2 which are formed of mutually different ultraviolet curing resins, and contacted and cemented to each other, and the cementing surface thereof is a diffractive optical surface C where the diffraction grating grooves are formed (see FIG. 2). In this example, resins having a refractive index indicated in [the resin refractive index] in each table is used for a material constituting the diffractive optical element members PF1 and PF2. The refractive index of the resin indicates the refractive index after the resin is cured.

The fifth lens group G5 includes, in order from the object, a positive lens L51, a negative lens L52, a positive lens L53 and a positive lens L54.

The sixth lens group G6 includes, in order frau the object, a cemented lens of a positive lens L61 and a negative lens L62, and a negative lens L63. The image side surface of the negative lens L62 disposed to the image side is aspherical.

Table 2 below shows a value of each data according to Example 2. The surface numbers 1 to 35 in Table 2 corresponds to the surfaces 1 to 35 in FIG. 5.

TABLE 2

[General Data]

|  | Wide-angle end | Telephoto end |
|---|---|---|
| f = | 200~ | 400 |
| FNo = | 4.0~ | 5.8 |
| Y = | 21.6~ | 21.6 |
| Σd = | 172.7~ | 219.3 |

[Lens Data]

| Surface number | r | d | nd | νd |
|---|---|---|---|---|
| 1 | 101.375 | 7.50 | 1.51680 | 64.10 |
| 2 | 829.462 | 0.15 | | |
| 3 | 162.254 | 2.00 | 1.70154 | 41.17 |
| 4 | 61.200 | 12.40 | 1.49782 | 82.52 |
| 5 | −1601.338 | D5(Variable) | | |
| 6 | −307.751 | 2.00 | 1.58267 | 46.48 |
| 7 | 86.313 | 1.72 | | |
| 8 | 109.510 | 2.00 | 1.51742 | 52.31 |
| 9 | 58.754 | 4.20 | 1.75520 | 27.51 |
| 10 | 128.984 | D10(Variable) | | |
| 11 | 45.481 | 6.20 | 1.53172 | 48.87 |
| 12*a | 98.181 | 5.02 | | |
| 13 | 71.930 | 2.20 | 1.69895 | 30.13 |
| 14 | 44.046 | 0.21 | | |
| 15 | 41.816 | 5.00 | 1.51823 | 58.94 |
| 16*a | 61.232 | 7.74 | | |
| 17*s | ∞ | D17(Variable) | | |
| 18 | 45.510 | 4.87 | 1.63980 | 34.56 |
| 19 | 81.187 | 1.50 | 1.62374 | 47.04 |
| 20 | 27.822 | 0.01 | 1.52780 | 33.41 |
| 21*d | 27.822 | 0.01 | 1.55710 | 49.74 |
| 22*a | 27.822 | D22(Variable) | | |
| 23 | 99.824 | 3.40 | 1.66760 | 41.96 |
| 24 | −848.472 | 4.02 | | |
| 25 | −38.820 | 4.00 | 1.72342 | 37.95 |
| 26 | 794.888 | 2.58 | | |
| 27 | −536.381 | 5.90 | 1.51860 | 69.98 |
| 28 | −47.887 | 0.59 | | |
| 29 | 94.376 | 6.00 | 1.48749 | 70.41 |
| 30 | −64.993 | D30(Variable) | | |
| 31 | −116.263 | 1.20 | 1.74400 | 44.78 |
| 32 | 27.684 | 8.80 | 1.59551 | 39.22 |
| 33 | −39.728 | 2.01 | | |
| 34 | −35.959 | 1.20 | 1.51860 | 69.98 |
| 35*a | 1706.358 | | | |

[Aspherical Data]

Surface 12  κ = 0.0000E+00,  A = 3.4269E−07,  B = −7.5310E−11
Surface 16  κ = 3.0353E−01,  A = 3.1405E−07,  B = −7.5310E−11
Surface 22  κ = −1.0955E−01,  A = 1.6203E−06,  B = −9.5778E−10
Surface 35  κ = −3.1191E+04,  A = 1.9671E−06,  B = −9.5778E−10

[Diffractive Optical Surface Data]

Surface 21    C2 = −5.8746E−05, C4 = −2.0985E−09

[Diffractive Optical Element Optical Data]

|  | nC | nd | nF | ng |
|---|---|---|---|---|
| Low refractive index | 1.523300 | 1.527800 | 1.539100 | 1.549100 |
| High refractive index | 1.553800 | 1.557100 | 1.565000 | 1.571300 |

[Partial dispersion ratio and deviation of positive lens of first lens group G1]

Positive lens L11 (normal dispersion glass)

(θg, F) = 0.5357, Δ(θg, F) = −0.0021
Positive lens L13 (anomalous dispersion glass)

(θg, F) = 0.5390, Δ(θg, F) = 0.0310

TABLE 2-continued

[Inter-group Distance Data]

|  | Wide-angle end | Telephoto end |
|---|---|---|
| D5 | 5.16 | 31.92 |
| D10 | 1.17 | 41.73 |
| D17 | 7.05 | 4.62 |
| D22 | 17.13 | 35.95 |
| D30 | 37.74 | 0.65 |

[Zoom Optical System Group Data]

| Group number | First surface of group | Group focal length |
|---|---|---|
| G1 | 1 | 173.0 |
| G2 | 6 | −175.5 |
| G3 | 11 | 197.3 |
| G4 | 20 | −138.6 |
| G5 | 23 | 80.2 |
| G6 | 31 | −87.9 |

[Conditional Expression]

Conditional Expression (1)   νdave = 34.6
Conditional Expression (2)   |φdoei/φi| = 0.0163
Conditional Expression (3)   TLw/fw = 1.096
Conditional Expression (4)   Pmin = 0.301

As the data in Table 2 shows, the zoom optical system ZL2 according to this example satisfies all the conditional expressions (1) to (4).

Figure 6:
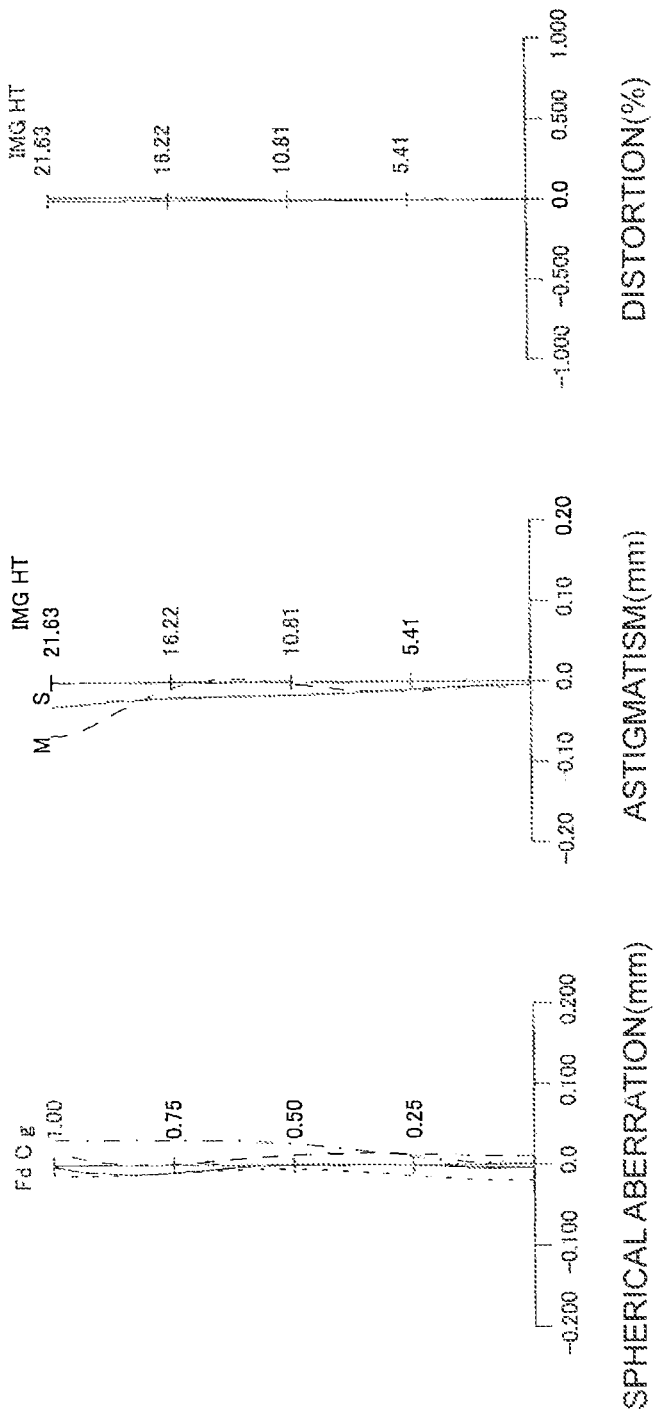
FIG. 6 are diagrams depicting longitudinal aberrations of the zoom optical system according to Example 2 upon focusing on infinity in the wide-angle end state.
Figure 7:
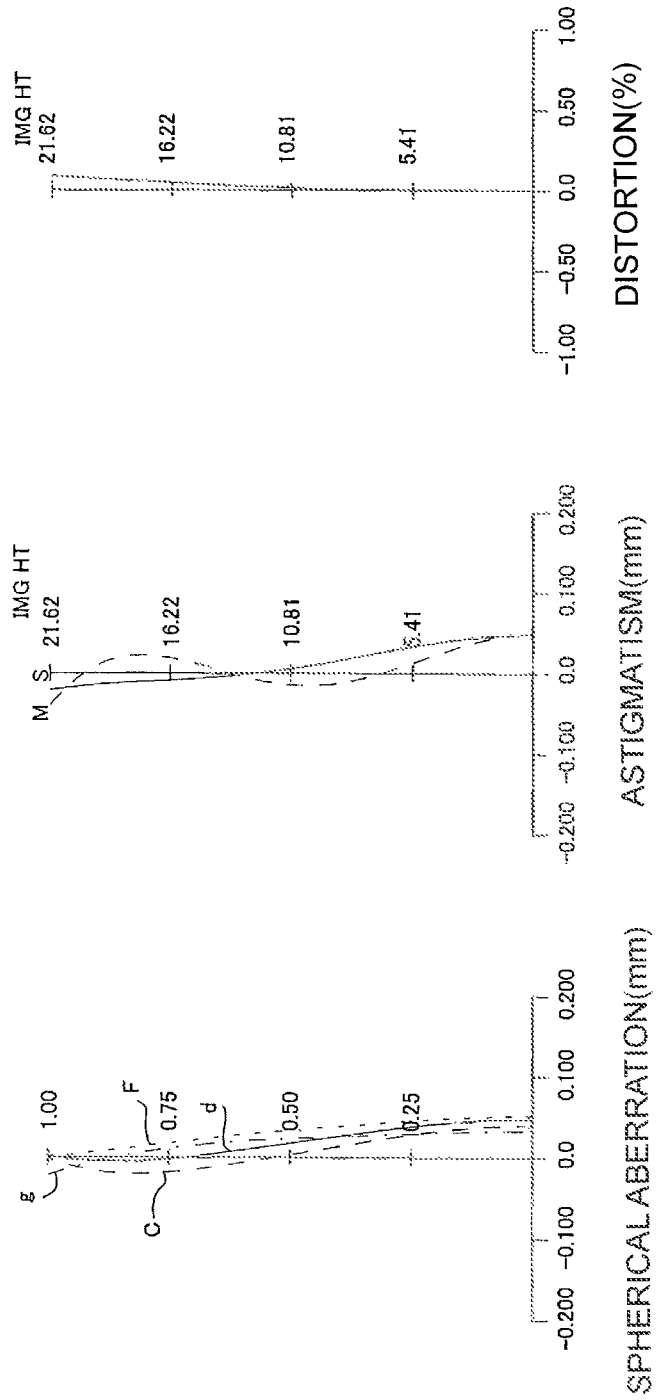
FIG. 7 are diagrams depicting longitudinal aberrations of the zoom optical system according to Example 2 upon focusing on infinity in the telephoto end state.

FIG. 6 and FIG. 7 are graphs showing various aberrations of the zoom lens ZL2 according to Example 2. FIG. 6 are graphs showing various longitudinal aberrations of the zoom lens system upon focusing on infinity in the wide-angle end state, and FIG. 7 are graphs showing various longitudinal aberrations of the zoom lens system upon focusing on infinity in the telephoto end state. In each graph showing the longitudinal aberrations, spherical aberration, astigmatism and distortion (in longitudinal direction) are shown sequentially from the left. Each of the graph shows ray tracing from the object side, performed in the zoom optical system ZL2 according to Example 2.

As each graph showing aberrations clarifies, in the zoom optical system according to Example 2, various aberrations, including spherical aberration, astigmatism and distortion are corrected well in each focal distance state from the wide-angle end state to the telephoto end state.

As described above, the present invention can provide a zoom optical system that is compact, corrects various aberrations, including chromatic aberration throughout the entire zoom range, and has high optical performance using a diffractive optical element effectively, and an imaging device having this zoom optical system.

Although the present invention has been described with the configuration requirements of the embodiments for assisting understanding, the present invention is not limited by these embodiments.

EXPLANATION OF NUMERALS AND CHARACTERS

ZL (ZL1, ZL2) zoom optical system
G1 first lens group
G2 second lens group
G3 third lens group
G4 fourth lens group
G5 fifth lens group
G6 sixth lens group
SP aperture stop
CAM digital single-lens reflex camera (imaging device)
1 imaging lens (zoom optical system)

The invention claimed is:

1. A zoom optical system comprising, in order from an object:

a first lens group having positive refractive power; a second lens group having negative refractive power; a third lens group having positive refractive power; and a fourth lens group having negative refractive power, upon zooming, distance between the first lens group and the second lens group varies, distance between the second lens group and the third lens group varies, and distance between the third lens group and the fourth lens group varies, the third lens group or the fourth lens group including at least one contact multi-layer type diffractive optical element, and the following conditional expressions are satisfied:

$$0.010 \leq |\phi doei/\phi i| \leq 0.025$$

where $\phi i$ denotes a total refractive power of the lens group including the contact multi-layer type diffractive optical element, and $\phi doei$ denotes a refractive power of the contact multi-layer type diffractive optical element, and $$0.8 \leq TLw/fw \leq 1.3$$

where TLw denotes a distance from a lens surface closest to an object to an image plane in a wide-angle end state, and fw denotes a focal length of the zoom optical system in the wide-angle end state.

2. The zoom optical system according to claim 1, wherein the third lens group includes, in order from an object, a positive lens, a negative lens and a positive lens, and all these lenses have a meniscus form having a concave surface facing an image.

3. The zoom optical system according to claim 1, wherein the lens group including the contact mulit-layer type diffractive optical element comprises lenses including at least one positive lens, and wherein the following conditional expression is satisfied:

$$30 \leq vdave \leq 70$$

where vdave denotes an average value of Abbe numbers of materials of the at least one positive lens included in the lens group including the contact multi-layer type diffractive optical element, excluding any lens of which an absolute value of refractive power is 1/5000 or less and excluding the contact multi-layer type diffractive optical element.

4. The zoom optical system according to claim 1, wherein the fourth lens group includes at least one lens having positive refractive power and at least one lens having negative refractive power.

5. The zoom optical system according to claim 1, wherein the following conditional expression is satisfied:

$$0.08 \text{ mm} \leq Pmin \leq 0.5 \text{ mm}$$

where Pmin denotes a minimum pitch of the contact multi-layer type diffractive optical element.

6. The zoom optical system according to claim 1, wherein the first lens group includes at least one lens having positive refractive power, and the at least one lens is anomalous dispersion glass.

7. The zoom optical system according to claim 1, wherein the third lens group includes at least one aspherical surface.

8. The zoom optical system according to claim 1, wherein the fourth lens group includes at least one aspherical surface.

9. The zoom optical system according to claim 1, further comprising a fifth lens group having positive refractive power and a sixth lens group having negative refractive power, which are sequentially disposed on an image side of the fourth lens group.

10. The zoom optical system according to claim 9, wherein the sixth lens group includes at least one aspherical surface.

11. An imaging device comprising the zoom optical system according to claim 1.

* * * * *